3,116,316
TERTIARY PHOSPHINES AND METHODS OF PREPARING SAME

Michael M. Rauhut, Norwalk, Conn., assignor to American Cyanamid Company, New York, N.Y., a corporation of Maine
No Drawing. Filed July 21, 1961, Ser. No. 125,640
3 Claims. (Cl. 260—465)

The present invention relates to novel tertiary phosphines. More particularly, the instant discovery concerns monocarbamoyl-substituted tertiary phosphines.

According to the present invention, novel tertiary phosphines of the formula $$R_1R_2P-\underset{\underset{H}{|}}{\underset{\|}{C}}-N-R$$
$$\phantom{R_1R_2P-}O$$

which phosphines are useful as flame retardants when applied to cotton cloth, or the like, are prepared from isocyanates of the formula RNCO and secondary phosphines of the formula $R_1R_2PH$. R in the above formulae represents aryl, substituted and unsubstituted; $R_1$ and $R_2$ each represent substituted and unsubstituted, saturated and unsaturated, branched and straight chain alkyl having from 1 to 18 carbon atoms, substituted and unsubstituted cycloalkyl, such as cyclohexyl and cyclopentyl, substituted and unsubstituted aryl, such as phenyl and naphthyl.

Pursuant to a typical embodiment of the instant invention, the following reaction is made to take place:

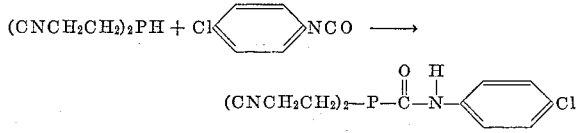

Reaction is best carried out in the presence of an inert organic solvent, such as an aromatic hydrocarbon, an ether, a halogenated hydrocarbon, or the like. Typical inert organic solvents are xylene, benzene, toluene, tetrahydrofuran, dioxane, chlorbenzene, chloroform, and the like.

Reaction may be made to take place at super-atmospheric, atmospheric, or sub-atmospheric pressure, preferably at atmospheric pressure. The sequence of addition is not critical, and the reaction may be performed under batch, continuous or semi-batch conditions. A wide range of temperatures may be employed, excellent results being achieved at ambient temperature. While temperatures in the range of 30° C. to 110° C. are preferred, temperatures as low as —15° C. and as high as 200° C. may be used.

Typical isocyanate reactants contemplated herein are aryl isocyanates, such as phenyl isocyanate, para-chlorophenyl isocyanate, 2,5-dichlorophenyl isocyanate, para-nitrophenyl isocyanate, meta-tolyl isocyanate, ortho-chlorophenyl isocyanate, para-methoxyphenyl isocyanate, meta-nitrophenyl isocyanate, 1-naphthyl isocyanate, 2-naphthyl isocyanate, and the like. It can be seen that typical inert substituents for the aryl isocyanates contemplated herein are lower alkyl, nitro, lower alkoxy, halogen (e.g. chlorine, bromine, etc.), and the like.

If desired, organic basic catalysts, including pentamethylguanidine, tertiary amines, such as tri-alkyl ($C_1$–$C_4$) amines may be employed to enhance the reaction contemplated herein. Only small amounts of these catalysts need be employed, i.e., amounts up to about 10 percent by weight based on the total weight of the ractants. As little as 0.05 percent by weight or less will often be helpful.

The present invention will be illustrated hereinafter by examples which are intended to further describe, not limit, the scope of the invention.

EXAMPLE I
*p-Chlorophenylcarbamylbis(2-Cyanoethyl)Phosphine*

A solution of 5.0 grams (0.036 mole) of bis(2-cyanoethyl)phosphine and 6.0 grams (0.039 mole) of p-chlorophenylisocyanate in 25 milliliters of benzene is heated to reflux under a nitrogen atmosphere. Heating is discontinued and 5 drops of triethylamine is added. When the mild reaction subsides, heat is again applied and the solution is refluxed for one hour. The reaction mixture is filtered while hot, and the filtrate when cool is diluted with petroleum ether. The oil which separates is combined with a small quantity of benzene, and crystallization is induced by scratching. After recrystallization from acetone-petroleum ether the melting point is 125° C.

EXAMPLES II-VIII

The following tabulated examples are carried out essentially as in Example I, above, the essential reaction condition differences being specified in the table:

TABLE I $R_1R_2PH + RNCO \longrightarrow R_1R_2P-\underset{\underset{H}{|}}{\underset{\|}{C}}-N-R$
$\phantom{R_1R_2P-}O$

| Example | Reactants | | Catalyst | Ratio Phosphine: Isocyanate | Temperature, ° C. | Solvent | Product | | |
|---|---|---|---|---|---|---|---|---|---|
| | Phosphine | Isocyanate | | | | | $R_1$ | $R_2$ | R |
| II | diethylphosphine. | para-chlorophenyl isocyanate. | tributylamine. | 1:1 | 30 | xylene | ethyl | ethyl | para-chlorophenyl. |
| III | dioctylphosphine. | 2,5-dichlorophenyl isocyanate. | trimethylamine. | 1:1 | 20 | tetrahydrofuran | octyl | octyl | 2,5-dichlorophenyl. |
| IV | didodecylphosphine. | para-nitrophenyl isocyanate. | tributylamine. | 3:1 | 90 | dioxane | dodecyl | dodecyl | para-nitrophenyl. |
| V | diisopropylphosphine. | meta-tolyl isocyanate. | tripropylamine. | 1:1 | 30 | toluene | isopropyl | isopropyl | meta-tolyl. |
| VI | dicyclohexylphosphine. | para-methoxyphenyl isocyanate. | triethylamine. | 1:3 | 50 | dimethylformamide | cyclohexyl | cyclohexyl | para-methoxyphenyl. |
| VII | dicyclopentylphosphine. | 1-naphthyl isocyanate. | pentamethylguanidine. | 1:1 | 22 | chloroform | cyclopentyl | cyclopentyl | 1-naphthyl. |
| VIII | dioctadecylphosphine. | para-bromophenyl isocyanate. | ----do---- | 1:2 | 50 | trichloroethane | octadecyl | octadecyl | para-bromophenyl. |

EXAMPLE IX

*Dibutyl(1-Naphthylcarbamoyl)Phosphine*

A solution of 16.9 grams (0.1 mole) of 1-naphthylisocyanate in 25 milliliters of benzene is combined with a solution of 14.6 grams (0.1 mode) of dibutylphosphine in 25 milliliters of benzene under nitrogen. An exothermic reaction takes place. The solution is then boiled for 15 minutes and evaporated under reduced pressure. The residual liquid is dissolved in 40 milliliters of petroleum ether (boiling point 30° C.–60° C.) and the solution cooled to 5° C. The product crystallizes and is collected to obtain 16.6 grams (53 percent by weight), melting point 80° C.–81° C.

EXAMPLES X–XXIII

The following tabulated reactions are carried out essentially as in Example IX, above, the essential differences in reaction conditions being specified in the table:

TABLE II $$R_1R_2PH + RNCO \longrightarrow R_1R_2P-\overset{\overset{O}{\|}}{C}-\overset{\overset{H}{|}}{N}-R$$

| Example | Reactants – Phosphine | Reactants – Isocyanate | Catalyst | Ratio Phosphine: Isocyanate | Temperature, °C. | Solvent | Product – $R_1$ | Product – $R_2$ | Product – R |
|---|---|---|---|---|---|---|---|---|---|
| X | dimethylphosphine. | phenyl isocyanate. | none | 1:1 | 30 | benzene | methyl | methyl | phenyl. |
| XI | dioctylphosphine. | meta-chlorophenyl isocyanate. | ---do--- | 1:1 | 6 | diethylether | octyl | octyl | meta-chlorophenyl. |
| XII | didodecylphosphine. | para-methylphenyl isocyanate. | triethylamine. | 3:1 | 100 | toluene | dodecyl | dodecyl | para-methylphenyl. |
| XIII | diisobutylphosphine. | para-fluorophenyl isocyanate. | none | 1:1 | 55 | chloroform | isobutyl | isobutyl | para-fluorophenyl. |
| XIV | diethylphosphine. | meta(trifluoromethyl)-phenyl isocyanate. | ---do--- | 1:1 | 35 | $CH_3OCH_2CH_2OCH_3$ | ethyl | ethyl | meta(tri-. |
| XV | bis(trifluoromethyl)-phosphine. | 2-naphthyl isocyanate. | ---do--- | 1:1.5 | 70 | benzene | trifluoromethyl. | trifluoromethyl. | 2-naphthyl. |
| XVI | diphenylphosphine. | meta-bromophenyl isocyanate. | triethylamine. | 1:1 | 82 | ---do--- | phenyl | phenyl | meta-bromophenyl. |
| XVII | dibenzylphosphine. | phenyl isocyanate. |  | 1:1 | 85 | ---do--- | benzyl | benzyl | phenyl. |
| XVIII | bis(2-butoxyethyl)-phosphine | para-methylphenyl isocyanate. | tributylamine. | 1.5:2 | 95 | toluene | 2-butoxyethyl. | 2-butoxyethyl. | para-methylphenyl. |
| XIX | bis(para-chlorophenyl)-phosphine. | phenyl isocyanate. | tripropylamine. | 1:1 | 65 | chloroform | para-chlorophenyl. | para-chlorophenyl. | phenyl. |
| XX | bis(para-methylphenyl)-phosphine. | ---do--- | triethylamine. | 4:1 | 80 | benzene | para-methylphenyl. | para-methylphenyl. | Do. |

It follows from the above representative examples that typical substituents for the secondary phosphine reactants are lower alkyl, phenyl, halogen, lower alkoxy, cyano, and the like. Characteristically, these and like substituents are inert under the reactions contemplated herein.

The products of the present invention are useful as fire retardants for cotton cloth, as indicated hereinabove. For example, cotton cloth dipped, according to well-known procedures, in a suitable solution of any one of these monocarbamoyl-substituted tertiary phosphines manifests desirable fire retardance.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:
1. A tertiary phosphine of the formula

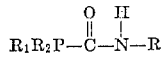

wherein R is a member selected from the group consisting of phenyl, naphthyl and substituted phenyl, said substituents for phenyl being selected from the group consisting of lower alkyl, nitro, lower alkoxy and halogen; $R_1$ and $R_2$ each represent a member selected from the group consisting of alkyl having from 1 to 18 carbon atoms, substituted alkyl having from 1 to 18 carbon atoms, cyclohexyl, cyclopentyl, phenyl, substituted phenyl, naphthyl and substituted naphthyl, said substituents for alkyl being selected from the group consisting of halogen, lower alkoxy, cyano and phenyl, and said substituents for phenyl and naphthyl being selected from the group consisting of lower alkyl, halogen, lower alkoxy and cyano.

2. Para-chlorophenylcarbamylbis(2-cyanoethyl)phosphine.

3. Dibutyl(1-naphthylcarbamoyl)phosphine.

References Cited in the file of this patent

UNITED STATES PATENTS 2,969,390    Buckler _____ Jan. 24, 1961

UNITED STATES PATENT OFFICE
CERTIFICATE OF CORRECTION

Patent No. 3,116,316                                                December 31, 1963

Michael M. Rauhut

It is hereby certified that error appears in the above numbered patent requiring correction and that the said Letters Patent should read as corrected below.

Columns 1 and 2, TABLE I, fifth column, line 2 thereof, for "1:1" read -- 1:2 --; column 3, line 6, for "mode" read -- mole --; columns 3 and 4, TABLE II, sixth column, line 2 thereof, for "6" read -- 60 --.

Signed and sealed this 30th day of June 1964.

(SEAL)
Attest:

ERNEST W. SWIDER                                                      EDWARD J. BRENNER
Attesting Officer                                                                  Commissioner of Patents